(12) United States Patent
Meng et al.

(10) Patent No.: US 7,561,422 B2
(45) Date of Patent: Jul. 14, 2009

(54) FLAT PANEL DISPLAY SUBASSEMBLY HAVING SHIELDING STRUCTURE

(75) Inventors: Xian-Lei Meng, Shenzhen (CN); Rong-Ping Xia, Shenzhen (CN)

(73) Assignees: Innocom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 178 days.

(21) Appl. No.: 11/639,991

(22) Filed: Dec. 15, 2006

(65) Prior Publication Data

US 2007/0138485 A1 Jun. 21, 2007

(30) Foreign Application Priority Data

Dec. 16, 2005 (TW) .............................. 94144798 A

(51) Int. Cl.
*G06F 1/16* (2006.01)

(52) U.S. Cl. ...................................... 361/681

(58) Field of Classification Search ................. 361/681, 361/683–684, 724–726; 349/58–60, 149–152
See application file for complete search history.

(56) References Cited

U.S. PATENT DOCUMENTS

| | | | |
|---|---|---|---|
| 5,938,457 A * | 8/1999 | Oh et al. ..................... 439/131 |
| 6,847,415 B1 * | 1/2005 | Yoshimura et al. ............ 349/58 |
| 7,075,241 B2 | 7/2006 | Kim et al. |
| 2007/0103605 A1 * | 5/2007 | Maruta ....................... 348/797 |

* cited by examiner

*Primary Examiner*—Jean F Duverne
(74) *Attorney, Agent, or Firm*—Wei Te Chung

(57) ABSTRACT

An exemplary flat panel display subassembly (1) includes a chassis (14), and a shielding structure (16) detachably secured to the chassis. The chassis includes a location bridge (144) at an outer surface thereof, and an opening (147) defined adjacent the location bridge. The shielding structure covers the opening, and includes a top portion (160) localized by the location bridge, and a bottom portion elastically abutting an inner surface of the chassis.

6 Claims, 6 Drawing Sheets

FLAT PANEL DISPLAY SUBASSEMBLY HAVING SHIELDING STRUCTURE

FIELD OF THE INVENTION

The present invention relates to flat panel display (FPD) subassemblies, and more particularly to a flat panel display subassembly having a shielding structure that can shield electromagnetic interference (EMI).

GENERAL BACKGROUND

Flat panel displays are commonly used as display devices for compact electronic apparatuses. Referring to FIG. 5, a typical flat panel display subassembly 5 includes a front frame 50, a display panel 52, and a chassis 54, arranged in that order from left to right. The flat panel display subassembly 5 further includes a shielding structure 56, and a back cover 58. The front frame 50 and the back cover 58 cooperatively define a space (not labeled) for accommodating the display panel 52, the chassis 54, and the shielding structure 56.

The chassis 54 includes three hooks 542 integrally formed thereat. The hooks 542 point to a same direction. The chassis 54 further defines an opening 544 at two perpendicularly adjoined walls (not labeled) thereof. The opening 544 is under the hooks 542, and provides convenient access for attaching or removing low voltage differential signaling (LVDS) wires (not shown) of the display panel 52. The shielding structure 56 is L-shaped, and includes a first plate 562 and a second plate 564 perpendicularly connected with the first plate 562.

Referring also to FIG. 6, when the shielding structure 56 is secured to the chassis 54, the first plate 562 is secured by a bolt 59 having a bolt thread (not shown) thereon, and the second plate 564 is secured by the hooks 542. Thereby, the opening 544 is respectively covered by the first plate 562 and the second plate 564. However, the need for the bolt 59 makes the process of securing or removing the shielding structure 56 inconvenient. Further, a step of threadingly engaging the bolt 59 is typically performed by manual labor, and adds to the cost of manufacturing the flat panel display subassembly 5.

What is needed, therefore, is a flat panel display subassembly that can overcome the above-described deficiencies.

SUMMARY

In one preferred embodiment, a flat panel display subassembly includes a chassis, and a shielding structure detachably secured to the chassis. The chassis includes a location bridge at an outer surface thereof, and an opening adjacent the location bridge. The shielding structure covers the opening, and includes a top portion localized by the location bridge, and a bottom portion elastically abutting an inner surface of the chassis.

Other aspects, advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

DETAILED DESCRIPTION OF PREFERRED EMBODIMENTS

Reference will now be made to the drawings to describe the preferred embodiments in detail.

Figure 1:
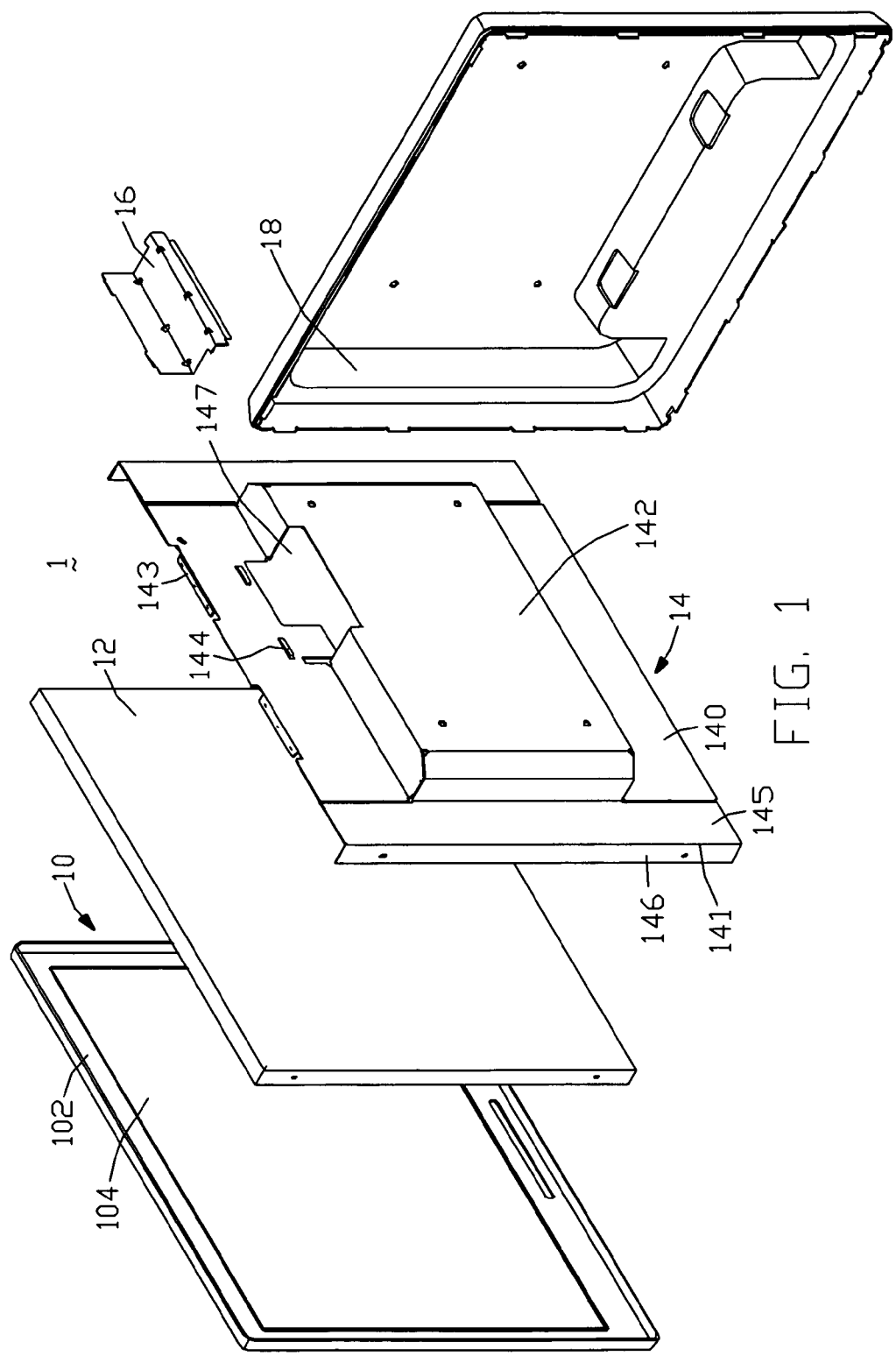
FIG. 1 is an exploded, isometric view of a flat panel display subassembly according to an exemplary embodiment of the present invention, the flat panel display subassembly including a display panel, a chassis, and a shielding structure.

Referring to FIG. 1, a flat panel display subassembly 1 according to an exemplary embodiment of the present invention is shown. The flat panel display subassembly 1 includes a front frame 10, a display panel 12, a chassis 14, a shielding structure 16, and a back cover 18, arranged in that order from left to right. The front frame 10 and the back cover 18 cooperatively define a space (not labeled) for accommodating the display panel 12, the chassis 14, and the shielding structure 16.

The front frame 10 includes four side walls 102 connected end to end, thus defining a window 104 for allowing viewing of the display panel 12. The front frame 10 has a size which is substantially equal to a size of the display panel 12.

The chassis 14 includes a main plate 140, two opposite side walls 141, an offset back wall 142, two pairs of location flanges 143 (only one pair visible), and two location bridges 144. The main plate 140 is substantially rectangular. Each side wall 141 is L-shaped, and includes a first wall 145, and a second wall 146. The first walls 145 outwardly extend from two vertical sides (not labeled) of the main plate 140, respectively. The second walls 146 perpendicularly extend from respective edges of the first walls 145 toward the display panel 12. A distance between the second walls 146 is substantially equal to a horizontal length of the display panel 12. The location flanges 143 perpendicularly extend from top portions and bottom portions of the main plate 140 toward the display panel 12, respectively. A distance between the top and bottom pairs of location flanges 143 is substantially equal to a vertical height of the display panel 12. That is, the display panel 12 can be fittingly received and localized in the chassis 14 by the second walls 146 and the location flanges 143. The location bridges 144 are integrally formed at the main plate 140, and are above the back wall 142. The back wall 142 outwardly extends from the main plate 140, and defines a space (not labeled) adjacent the display panel 12 for accommodating a printed circuit board (not shown) and other components of a corresponding flat panel display. The chassis 14 is preferably made from iron, steel, aluminum, magnesium, or any suitable alloy thereof.

An opening 147 is defined at both the main plate 140 and the back wall 142, corresponding to a position of LVDS wires (not shown) of the display panel 12. The opening 147 is under the location bridges 144. Operations needed for attaching or removing the LVDS wires (e.g. for maintenance) can be performed by accessing corresponding parts of the flat panel display through the opening 147. That is, the opening 147 enables convenient maintenance of the LVDS wires, without the need for detaching the display panel 12 from the chassis 14.

Figure 2:
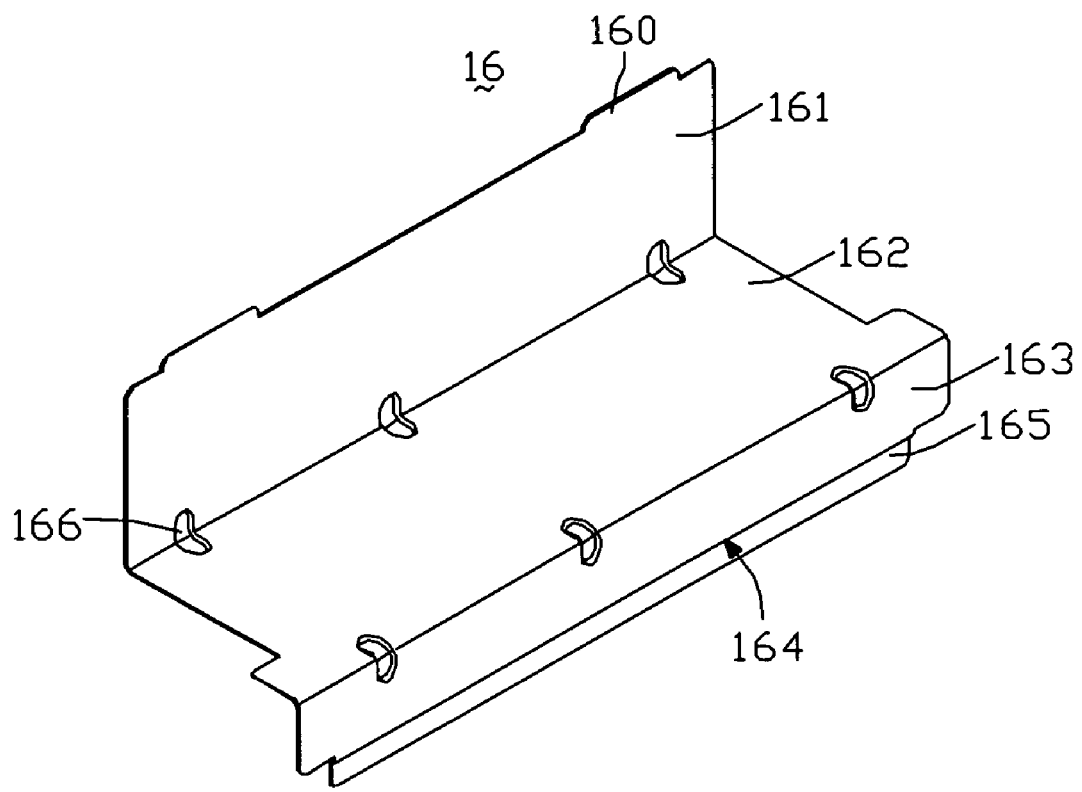
FIG. 2 is an enlarged view of the shielding structure of FIG. 1.

Referring also to FIG. 2, the shielding structure 16 includes two detents 160, a first plate 161, a first connection plate 162, a second plate 163, a second connection plate 164, and a third plate 165. The detents 160 integrally extend from a top portion (not labeled) of the first plate 161, and respectively correspond to the location bridges 144 of the chassis 14. In the illustrated embodiment, the detents 160 are bar shaped. The first connection plate 162 extends from a bottom portion (not labeled) of the first plate 161, and perpendicularly interconnects the first plate 161 and the second plate 163, thereby defining a first step (not labeled) thereat. The second connection plate 164 perpendicularly interconnects the second plate 163 and the third plate 165, thereby defining a second step (not labeled) thereat. That is, the first plate 161, the second plate 163, and the third plate 165 are parallel to each other. The second connection plate 164 is parallel to the first connection plate 162. A distance between the first plate 161 and the second plate 163 is larger than a distance between the first plate 161 and the third plate 165. That is, the third plate 165 is closer to the first plate 161 than the second plate 163 is. A length of a portion of the first connection plate 162 adjacent to the second plate 163 is greater than a length of the opening 147, and the same as a length of the second plate 163. Thereby, the first connection plate 162 and the second plate 163 avoid falling through the opening 147 into the back wall 142. The shielding structure 16 further includes a plurality of reinforcing ribs 166 formed where the first connection plate 162 connects with the first plate 161 and where the first connection plate 162 connects with the second plate 163. The shielding structure 16 can shield EMI outside the display panel 12. The shielding structure 16 is elastic, and is preferably made from tinplate.

The back cover 18 has a size substantially the same as a size of the front frame 10, and receives the chassis 14. The back cover 18 is preferably made from plastic, polymer, or another suitable material.

Figure 3:
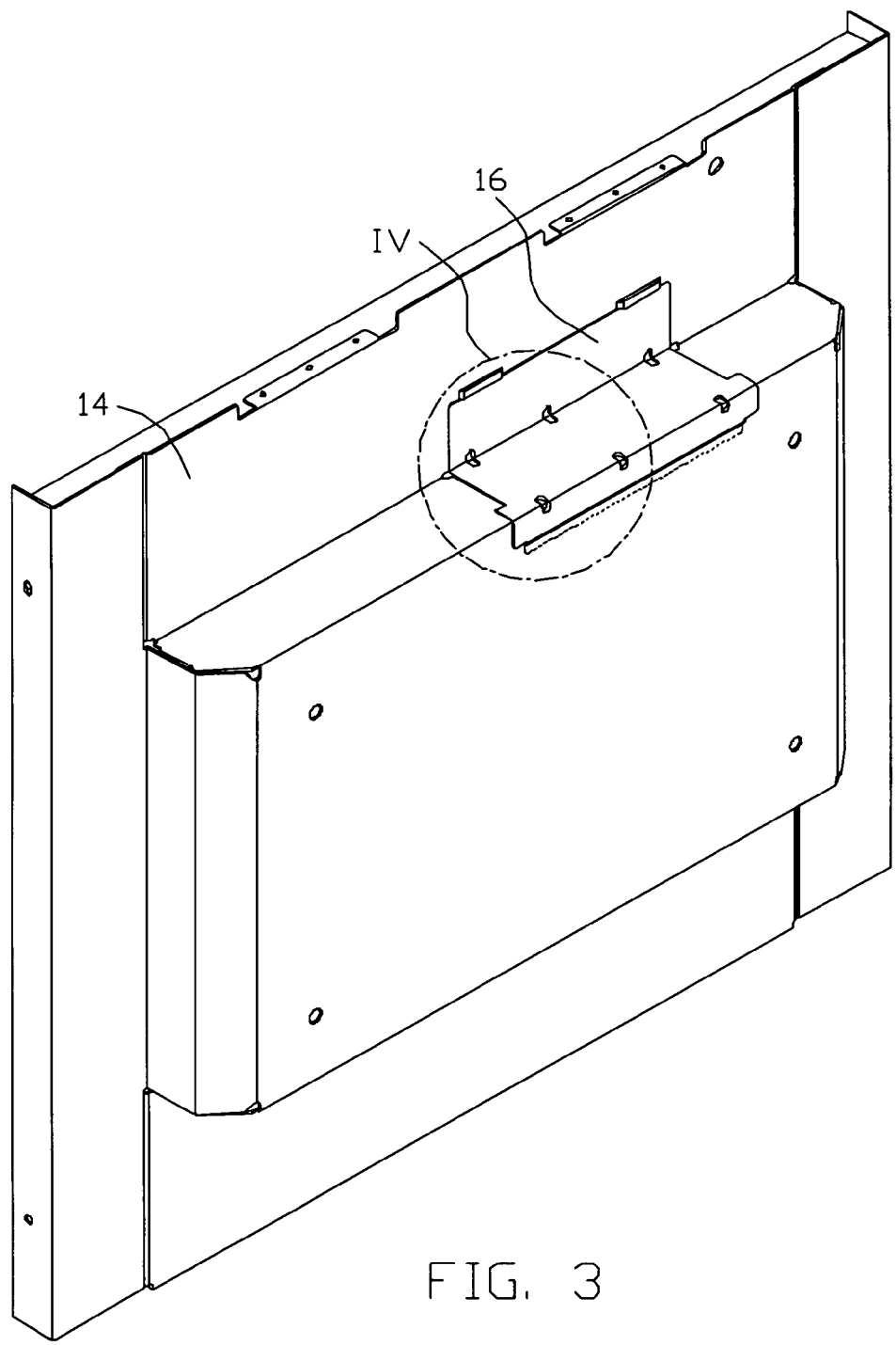
FIG. 3 is an assembled view of the display panel, the chassis, and the shielding structure of FIG. 1.
Figure 4:
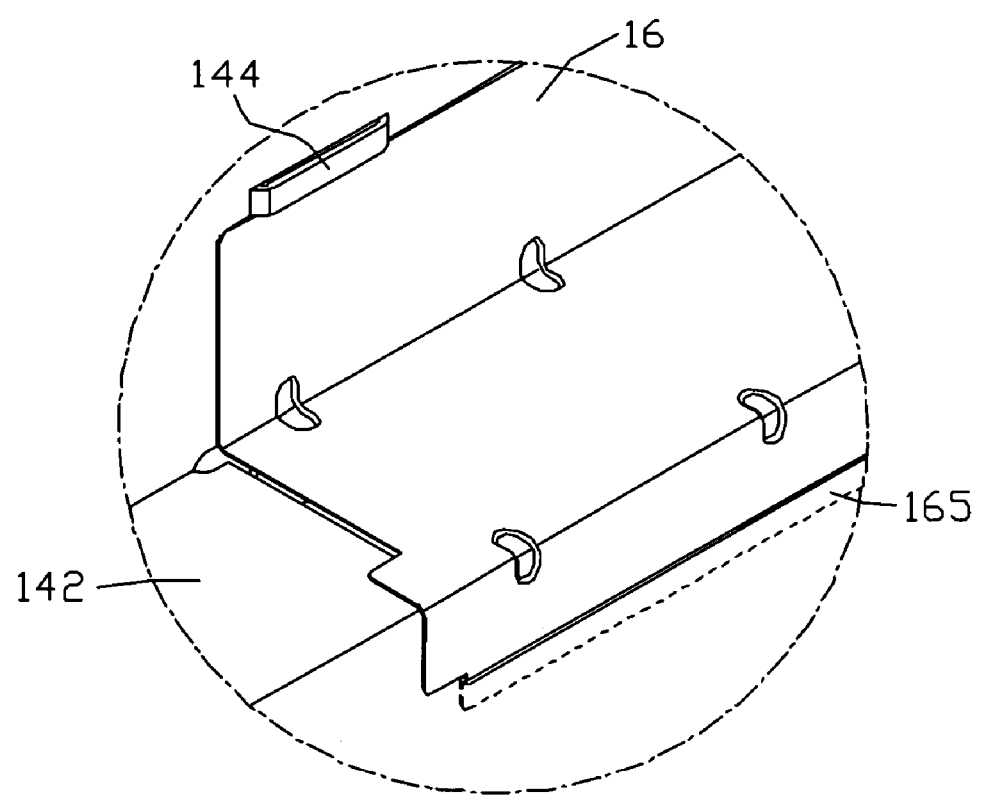
FIG. 4 is an enlarged view of a circled portion IV of FIG. 3.
Figure 5:
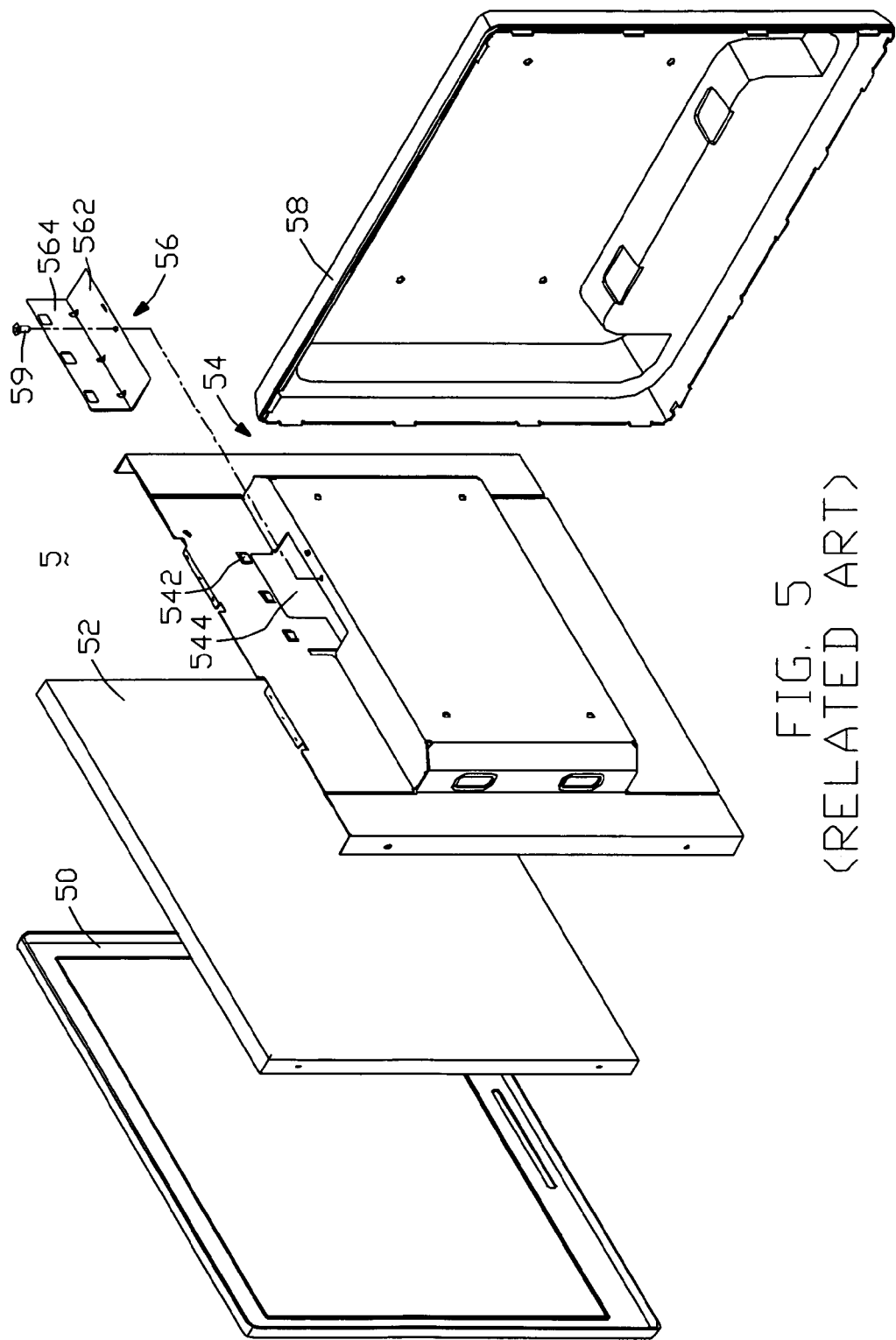
FIG. 5 is an exploded, isometric view of a conventional flat panel display subassembly, the flat panel display subassembly including a chassis and a shielding structure.
Figure 6:
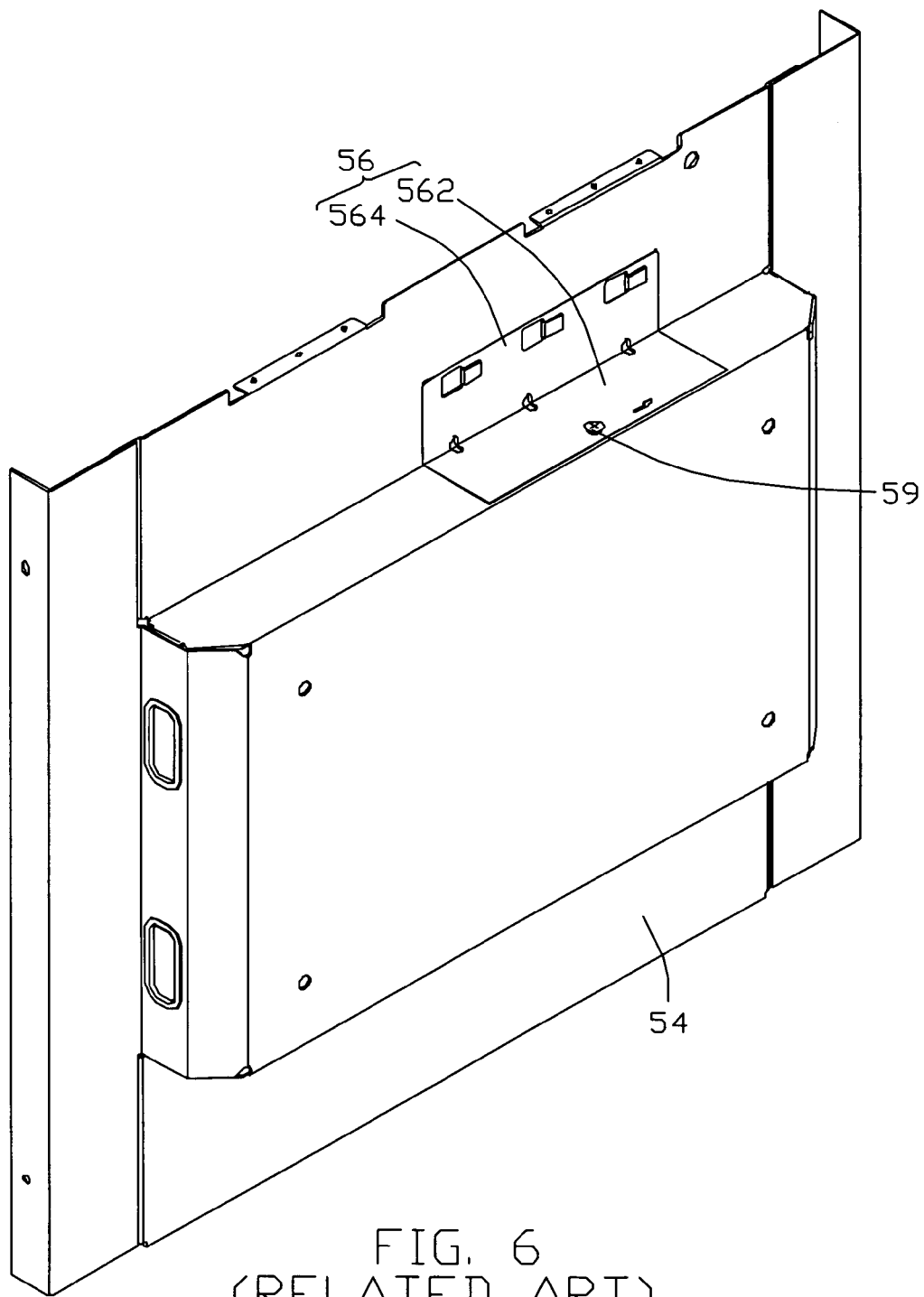
FIG. 6 is an assembled view of the chassis and the shielding structure of FIG. 5.

Referring also to FIG. 3 and FIG. 4, the shielding structure 16 can be secured to the chassis 14 as follows. First, the detents 160 of the shielding structure 16 are respectively inserted into the location bridges 144 of the chassis 14, such that a top portion of the shielding structure 16 is localized, thereby preventing the shielding structure 16 from moving upwardly. The opening 147 is respectively covered by the first plate 161, the first connection plate 162, and the second plate 163. Second, the third plate 165 is elastically pressed into the space via the opening 147, such that the third plate 165 elastically abuts an inner surface of the back wall 142 below the opening 147 of the back wall 142, and said long portion of the first connection plate 162 and the second plate 163 abut respective outer surfaces of the back wall 142. Thus the opening 147 is completely covered by the shielding structure 16, which itself is firmly secured to the chassis 14.

The shielding structure 16 is fittingly secured to the chassis 14 as described above, and is able to be thus secured by reason of its elasticity. Therefore unlike in conventional art, there is no need for a bolt or a step of threadingly engaging the bolt. The shielding structure 16 can be secured to the chassis 14 or removed from the chassis 14 conveniently. This also means the cost of manufacturing the flat panel display subassembly 1 can be reduced.

Further or alternative embodiments may include the following. In one example, there can be one, three or more location bridges 144, and the shielding structure 16 can have a corresponding number of detents 160. In another example, the opening 147 may have any of various shapes, and the shielding structure 16 can be correspondingly shaped to cover the opening 147.

It is believed that the present embodiments and their advantages will be understood from the foregoing description, and it will be apparent that various changes may be made thereto without departing from the spirit or scope of the invention or sacrificing all of its material advantages, the examples hereinbefore described merely being preferred or exemplary embodiments of the invention.

What is claimed is:

1. A flat panel display subassembly comprising:
   a chassis comprising:
      a location bridge at an outer surface thereof; and
      an opening adjacent the location bridge; and
      an elastically deformable shielding structure detachably secured to the chassis, the shielding structure covering the opening and comprising:
      a top portion localized by the location bridge; and
      a bottom portion elastically abutting an inner surface of the chassis; wherein the chassis comprises a main plate, and an offset back wall outwardly extending from the main plate; wherein the location bridge is formed at the main plate; wherein the opening is defined at the main plate and the back wall; wherein the location bridge is formed at the main plate; wherein the opening is under the location bridge; wherein the shielding structure comprises a first plate, a second plate, and a connection plate interconnecting the first plate and the second plate, thereby defining a step covering the opening;
   wherein a length of a portion of the connection plate adjacent to the second plate is greater than a length of the opening.

2. The flat panel display subassembly in claim 1, wherein the first plate, the second plate, and the top portion are parallel to the main plate.

3. The flat panel display subassembly in claim 2, wherein a distance between the first plate and the second plate is larger than a distance between the first plate and the third plate.

4. The flat panel display subassembly in claim 1, wherein the top portion coplanarly extends from the first plate.

5. A flat panel display subassembly comprising:
   a chassis defining an opening; and
   a one-piece shielding structure comprising at least two plates adjoining each other at at least one substanlially linear junction, such that the shielding structure is elastically deformable with at least one of the at least two plates being bendable relative to at least another one of the at least two plates about the at least one substantially linear junction, and the shielding structure is deformed and biasedly engaged with the chassis and covers the opening; wherein the chassis comprises a main plate, and an offset back wall outwardly extending from the main plate; wherein the opening is defined at the main plate and the back wall; wherein a maximum length of the shielding structure is greater than a maximum length of the opening such that the shielding structure avoids falling through the opening into the back wall.

6. A flat panel display subassembly comprising;
   a chassis defining a main plate with a back wall raised above the main plate in a substantially parallel relation;
   a circumferential wall linked between the back wall and the main plate;
   an opening formed in the main plate, the circumferential wall and the back wall;

a metallic shielding structure comprising a first plate, a second plate connected to an end of the first plate in a perpendicular relation, and a third plate connected to an end of the second plate in the perpendicular relation and opposite to the first plate, the first plate, the second plate and the third plate covering the opening under a condition that the first plate is intimately located on the main plate, the second plate is intimately located on the circumferential wall, and the third plate is intimately located on the back wall; wherein outer edges of the first and third plates are equipped with flanges to lock to the main plate and the back wall, respectively, wherein a maximum length of the shielding structure is greater than a maximum length of the opening such that the shielding structure avoids falling through the opening into the back wall.

* * * * *